Oct. 10, 1933.  J. S. PECKER  1,929,512
CONSTRUCTION AND CONTROL OF AIRCRAFT HAVING AIR ACTUATED SUSTAINING MEANS
Filed Dec. 3, 1931   2 Sheets-Sheet 1

INVENTOR.
Joseph S. Pecker
BY
ATTORNEYS.

Oct. 10, 1933.  J. S. PECKER  1,929,512
CONSTRUCTION AND CONTROL OF AIRCRAFT HAVING AIR ACTUATED SUSTAINING MEANS
Filed Dec. 3, 1931  2 Sheets-Sheet 2
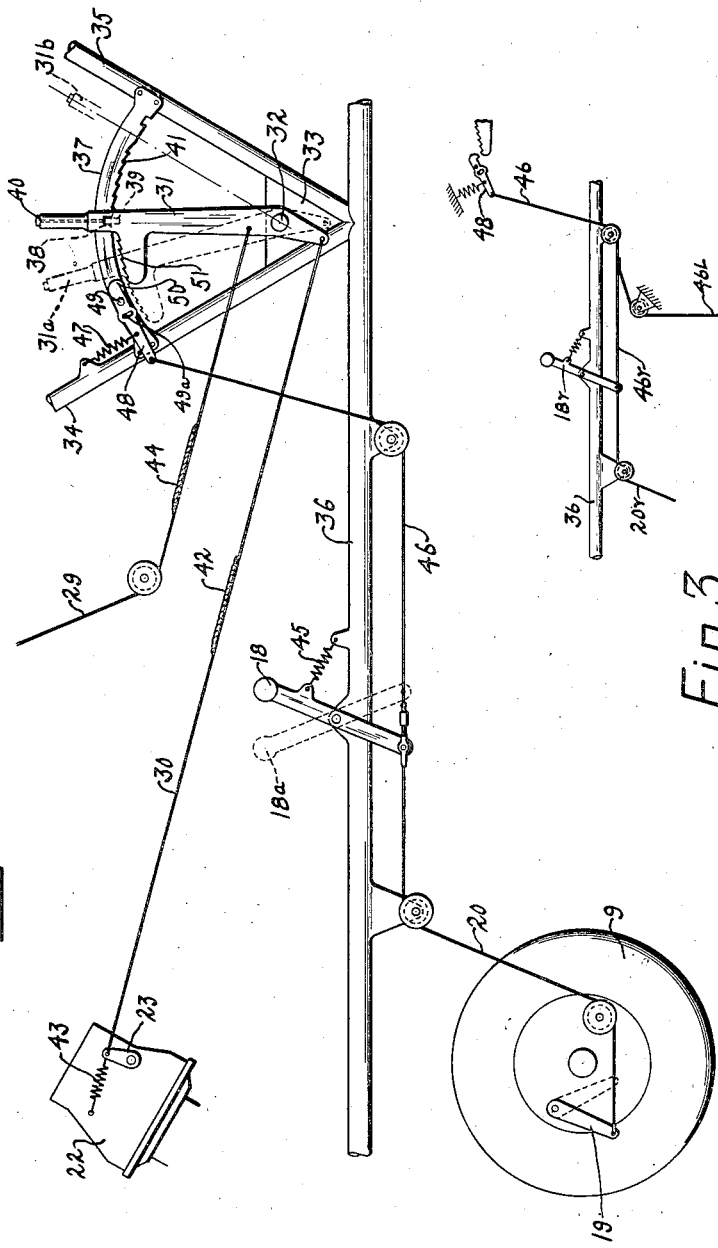
INVENTOR.
Joseph S. Pecker
BY
ATTORNEYS.

Patented Oct. 10, 1933

1,929,512

UNITED STATES PATENT OFFICE 1,929,512

CONSTRUCTION AND CONTROL OF AIRCRAFT HAVING AIR ACTUATED SUSTAINING MEANS

Joseph S. Pecker, Philadelphia, Pa., assignor to Autogiro Company of America, Philadelphia, Pa., a corporation of Delaware Application December 3, 1931. Serial No. 578,637

14 Claims. (Cl. 244—19)

This invention relates to aircraft with air actuated sustaining means, and particularly to the structure and operation of certain controls which are peculiar to such aircraft.

The nature of the invention will be better understood from a brief consideration of the major elements, and controls for such elements, in aircraft of the type here under consideration. In such a craft, there are: in addition to the propulsion engine and its throttle, the controls and their stick and the landing wheels and their brakes; the rotary wing starting device and its control and the rotary wing braking device with its control.

For convenience of operation and for quick take-off, it is desirable that the freely rotative wind driven wing system be provided with means for quickly bringing its rotational speed up to approximately normal autorotative speed which it assumes in flight, prior to the take-off. Such means is desirably composed of a driving mechanism between the prime mover of the craft and the air driven rotor, with a manual clutch for connecting the drive, and an over-running clutch or free wheel device to make doubly sure that the wing system will be solely under the influence of air flow in flight and totally disconnected from the power mechanism. For convenience, safety, and prevention of damage to the rotor or to surrounding objects, it is desirable that there be braking means for quickly retarding and stopping the rotation of the wing system after alighting; and this means preferably takes the form of a braking mechanism associated with the rotor hub and means for applying and releasing the brake.

In an ordinary aeroplane, for take-off, it is customary to hold the tail skid in contact with the ground by means of the elevator, which is raised by pulling back on the stick, to speed up the engine by throwing the throttle full on, to raise the tail by means of the elevator, and then to take off, keeping an alert watch on the field, and maintaining proper control by rudder and ailerons. In an aircraft having air driven rotary wings, however, the practice at present, in take-off, includes the additional steps of applying the wheel brakes, making certain that the rotor brake is off, engaging the rotor starter clutch, gradually speeding up the rotor to nearly normal flight speeds of rotation, disengaging the rotor starter clutch, releasing the wheel brakes, and bringing the engine up to full speed for take-off. Because of the foregoing characteristics of this type of craft, and also since the take-off should be made as quickly as posible after bringing the rotor up to speed so as to avoid loss in rotor R. P. M., it will be seen that it is highly desirable to simplify the controls and the operation thereof as much as possible, and to make their operation as positive, effective, and safe as they can be made.

It is a primary object of the present invention to accomplish the purposes just stated, and it is more specifically an object to attain these advantages by combining the controls or the operation thereof, so as to minimize the number of control elements to be manipulated and to simplify their operation.

More especially, I contemplate an inter-relation between the controls, or the operation of the controls, for the wheel brakes of the machine and the rotor starter, particularly the operating clutch thereof, and also preferably the rotor brake; and I do this in such manner, and by such mechanism, as to fully overcome the operational difficulties referred to, the mechanism further being very simple, of low cost, and easy of inspection and adjustment.

Still more specifically, the present invention comprehends control mechanism, in an aircraft of the type referred to, in which the control element or lever for the rotor starter clutch is interrelated, interconnected or interlocked with the control element or pedal for one or more of the wheel brakes for the machine; and further, in such manner that the starter lever will be held in "engaged" position, if moved to that position when the wheel brakes are in "on" position, and so that when the wheel brakes are released the rotor starter will be disengaged; and the invention further contemplates the combining or interrelating of said arrangement with the rotor brake element or lever, and, in fact, the utilization of a single element or lever for the rotor brake and starter controls which when released by the releasing of the wheel brake pedal will assume a neutral position (that is, with rotor brake and starter both out of engagement), and in which the rotor control lever, to be moved to rotor brake "on" position, necessitates an additional operation on the part of the pilot; and further, in which the rotor brake and rotor starter cannot both be operated at the same time. Additionally, the invention contemplates a construction in which either wheel brake may be released, for maneuvering on the ground, while the other wheel brake is kept applied and thus maintains the driving connection of the rotor starter.

How these and other objects and advantages which may be incident to the invention are obtained will be clear from the following description, viewed in the light of the accompanying drawings, in which drawings:—

Figure 2 is an enlarged, somewhat diagrammatic, fragmentary elevation of the essential parts of the mechanism of Figure 1 which embodies the invention; and Figure 3 is a diagrammatic detail of a modification of part of the mechanism of Figure 2.

Figure 1:
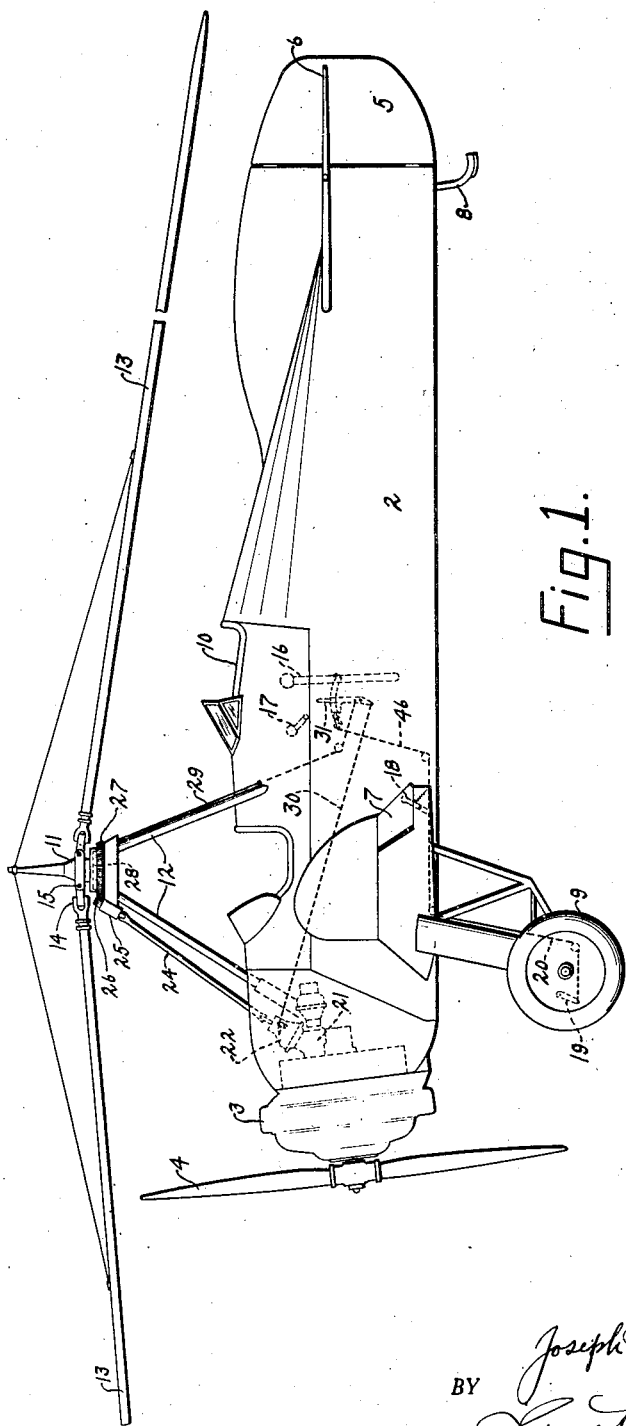
Figure 1 is a side elevational view of an aircraft with a freely wind driven rotary wing system, illustrating the structure of the present invention in phantom outline.

The aircraft 2 is provided with an engine and propeller 3, 4, rudder and elevator 5, 6, aileron 7, tail skid 8, alighting gear which may include wheels 9, a pilot's cockpit 10, and a rotative sustaining wing system including a freely rotatable hub 11 mounted on a pylon 12 and having wings 13 which are individually pivoted by vertical and horizontal pivot pins 14 and 15.

A control stick 16 is provided for the elevators and ailerons, a throttle 17 for the engine and a brake pedal or pedals 18 for operating the wheel brakes through their levers 19 and cables 20.

At the back of the engine is a rotor drive or starting device 21, including a clutch the casing of which is indicated at 22. Said clutch may be engaged, by operation of its lever 23, to actuate the starter shaft 24, connected through a free wheel device 25, to the driving gearing 26, 27, the latter gear being connected to the rotor hub. Inside the hub is a brake 28, operable by a cable 29 extending down a leg of the pylon into the cockpit 10.

The rotor brake cable 29 and the rotor starter cable 30 are preferably connected, in the cockpit, to a common lever 31, their respective points of connection thereto being above and below the lever fulcrum 32, which latter is mounted on a frame 33 secured to diagonal braces 34, 35 extending upwardly from the longéron 36.

The braces 34 and 35 also form a convenient means of mounting the quadrant 37. At the neutral or mid point of the quadrant I preferably provide a deep notch 38, into which a spring-pressed catch member 39 on lever 31 is adapted to seat.

By depressing the catch 39 by means of button 40, the lever 31 may be released and moved backward toward the position 31b, for rotor brake operation, the catch 39 being adapted to cooperate with quadrant notches 41 for holding the rotor brake on. During such rotor brake operation, any excess slack in the starter operating cable 30 will be taken up by the elastic 42. In the mid position of the lever, however, cables 29 and 30 should be adjusted so as to be just free of slack, when the starter clutch release spring 43 has moved the clutch lever 23 to disengaged position (the position shown in Figure 2); the rotor brake release spring, not shown, also holding the rotor brake in disengaged position, under these circumstances.

By pressing button 40 to release latch 39 from notch 38, the lever 31 may be moved forwardly toward the position 31a, to engage the rotor starter clutch by pulling upon the clutch lever 23 against the tension of spring 43. Excess slack will then be produced in rotor brake cable 29, which will be taken up by the elastic member 44.

As will be seen from Figure 2, a spring 45 tends to hold the wheel brake pedal 18 in "released" position. By operation of said pedal to the position 18a the wheel brake is applied, by a pull upon cable 20. At the same time, the tension on cable 46 is released, which permits spring 47 to raise the forward end of lever 48, which is pivoted at 49 on the quadrant 37. Catch 50, on the opposite end of lever 48 will then move down in position to engage notches 51 carried by the rotor control lever 31. Thus, with or without the wheel brakes on, the lever 31 may be moved into starter operating position; and, if the wheel brakes are on, the lever 31, if moved to that position, will so remain until the wheel brakes are released. A stop pin 49a engages a slot in catch lever 48 to prevent excessive movement of the lever, on its pivot 49, in either direction.

Upon release of the wheel brakes, the catch 50 will be raised, and the lever 31 will move back to mid position, under the action of clutch spring 43. The rotor brake, however, will not be applied, unless the pilot again grasps the lever 31, depresses the latch 39, and moves the lever rearwardly.

It will now be seen that the tendency of the rotor control, when in neutral, is to remain in that position; that its tendency when in rotor brake "on" position is to remain in that position; its tendency when in rotor starter "on" position is to return to neutral position, unless the wheel brakes are in engagement at that time; that the immediate result of releasing the wheel brakes when said lever is in starter "on" position, is to cause a throwing of the lever to neutral, so that take-off or the machine ensures disengagement of the starter; and that in no case can both the rotor brake and the rotor starter be engaged at one time.

Figure 3 illustrates, in a diagrammatic manner, a part of the system of Figure 2, but arranged in parallel for operation by either wheel brake pedal. The cable 46 is divided into two parts, 46r connecting with the right brake pedal 18r and 46l connecting with the left brake pedal 18l. The right pedal 18r controls the brake of the right wheel through cable 20r, and the left pedal 18l controls the brake of the left wheel through cable 20l. With these connections, operation of either brake pedal actuates catch lever 48. Connections to both brake pedals, as in this figure, are desirable to allow greater freedom for maneuvering on the ground while the rotor is being started. In a stiff wind it is preferable to bring the rotor partially up to speed with the wind blowing approximately from the rear so as to avoid any tendency of the machine to lift or partially rise up prematurely; and then to turn the machine around and face directly into the wind for take-off. When both pedals are connected to the catch lever 48, one brake may be released for turning around, without the necessity of releasing the rotor clutch during such maneuver.

For the usual take-off, the fundamental operation involved in the present invention is as follows: The pilot first applies the wheel brakes, then engages the starter clutch, then speeds up the engine and finally simply releases the wheel brakes and takes off. The number of steps, and the amount of manipulation of controls, requisite to take-off are thus reduced to a minimum; there is no danger of the lever 31 setting the rotor brake; and the loss in R. P. M. of the rotor, between the starting operation and the take-off, is negligible.

In landing as soon as the machine rests upon the ground, the pilot may apply the rotor brake and the wheel brakes, both at the same time if he desires, or separately.

From the foregoing it will clearly appear that the operation and control of the air rotated wing type of craft are by my invention greatly simplified; that the risk of damage to the machine, or to parts thereof such as the rotor starting and braking mechanism, is reduced to a minimum; that the safety of occupants and of spectators is enhanced; and that the complication and cost of the control mechanism are reduced, especially in the forms of construction shown. It will be understood, however, that separate rotor brake and rotor clutch controls may be employed if desired; that the basic feature of the invention may be associated with an individual lever used solely for starter clutch operation; and that other changes might be made without departing from the spirit and scope of the invention.

I claim:—

1. In an aircraft, a sustaining-wing rotor, alighting mechanism, means for affecting operation of the rotor, means for affecting operation of the alighting mechanism and means for inter-relating the operation of the last two means.

2. In an aircraft, a sustaining-wing rotor, alighting mechanism, means for affecting operation of the rotor in one respect, means for affecting operation of the rotor in another respect, means for affecting operation of the alighting mechanism, and means for inter-relating the operation of the last three means.

3. In an aircraft, the combination of a rotative wing sustaining unit mounted for normal actuation by relative air flow, a starting device for said unit, landing gear brake mechanism, means for putting the starting device into operation, means for applying and releasing said brake mechanism, and means operating upon release of the brake mechanism to throw the starting device out of operation.

4. In an aircraft, a nomally wind-driven rotating wing system, means for imparting an initial driving action to said system, means for applying braking effort to said system, landing wheels for said aircraft with brake means for said wheels, control means for said driving means, control means for the rotor brake means, control means for the wheel brake means, and an interlocking mechanism between the control means for the wheel brake means and one of said other control means.

5. In an aircraft, a normally wind-driven rotating wing system, means for imparting an initial driving action to said system, means for applying braking effort to said system, landing wheels for said aircraft with brake means for said wheels, control means for said driving means, control means for the rotor brake means, control means for the wheel brake means, and means for positively inter-relating the operation of all said control means.

6. In an aircraft, the combination of a rotative wing sustaining unit mounted for normal actuation by relative air flow, a starting device for said unit, a brake for the aircraft, means for holding said starter and said brake in engaged position, and means operating upon release of the brake to disengage the starter.

7. In an aircraft, the combination of a rotative wing sustaining unit mounted for normal actuation by relative air flow, a starting device for said unit, a brake for the aircraft, means for holding said starter and said brake in engaged position, means operating upon release of the brake to disengage the starter, a brake for said unit, and means for preventing application of the latter brake when the starter is in engagement.

8. In combination with an aircraft sustaining rotor, a rotor starter and a rotor brake, a common movable control for the starter and brake, means for holding said control in neutral position, means for holding said control in brake engaged position, and means normally tending to return said control to neutral position when it is thrown into starter engaged position.

9. In combination with an aircraft sustaining rotor, a rotor starter and a rotor brake, a common movable control for the starter and brake, means for holding said control in neutral position, means for holding said control in brake engaged position, means normally tending to return said control to neutral position when it is thrown into starter engaged position, a controllable wheel brake device for the aircraft, and means for interlocking said device with said control when in starter engaged position.

10. In combination with an aircraft rotor starter and an aircraft rotor brake, a common control for the two movable between starter-on position and brake-on position, means for holding said lever in brake-on position when moved to that position, means for holding said lever in starter-on position when moved to that position, said last means including a wheel brake device and interconnecting mechanism, and means for automatically returning said lever to a neutral position upon release of the wheel brake device.

11. In an aircraft, a normally wind-driven rotary wing system, means for starting the system prior to take-off, and automatic means for throwing the starter out of operation upon take-off including a starter operating element, wheel brake means for the craft, and a releasable latch device connected with the wheel brake means and associated with said element in such manner that release of the said brake means releases the latch and thence said element.

12. In an aircraft, rotative sustaining wings normally actuated by relative air flow in flight, a mechanical starter for said wings, a landing gear having two wheels with individual brakes, a foot pedal control for each wheel brake, means for engaging the starter, and means interconnected with said last means and with the wheel brake means whereby engagement of either wheel brake is adapted to maintain the starter in operation regardless of the position of the other wheel brake.

13. In an aircraft, the combination of a rotative wing sustaining unit mounted for normal actuation by relative air flow, a starting device for said unit, a brake for the aircraft, means for operating the aircraft brake adapted to hold the starting device in operation, and means adapted upon release of the aircraft brake automatically to throw the starting device out of operation.

14. In combination with the usual flight and operation controls of an aircraft, a normally freely wind driven rotative sustaining wing system, a starter for initiating rotation of said system, control mechanism for connecting and disconnecting the starter, and means operatively inter-relating said control mechanism and one of the usual controls of the aircraft in such manner that operation of the control last mentioned for take-off of the craft actuates the starter control mechanism to disconnect the starter.

JOSEPH S. PECKER.